Jan. 1, 1935.                H. L. HARTZELL                1,986,339
                           ELECTRICAL CONDENSER
                            Filed Oct. 4, 1928
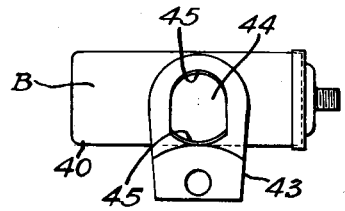
Fig. 1.
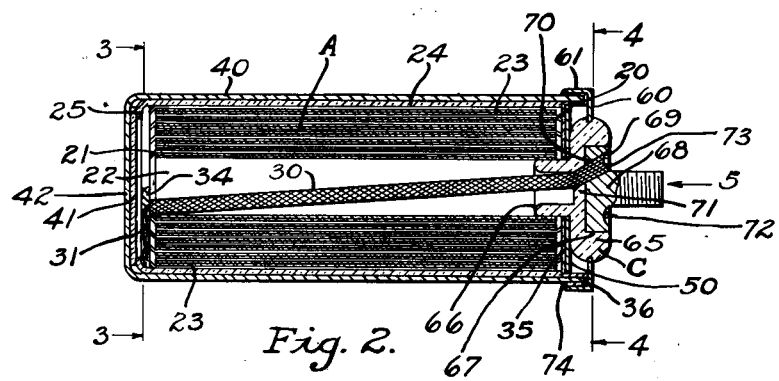
Fig. 2.
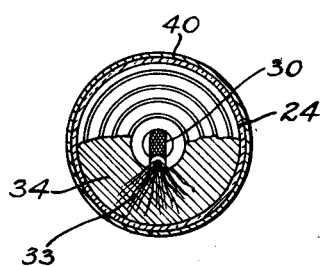    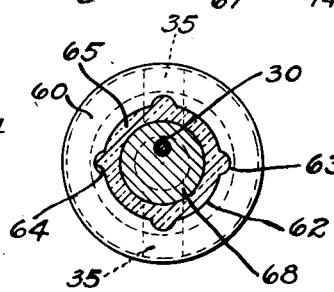    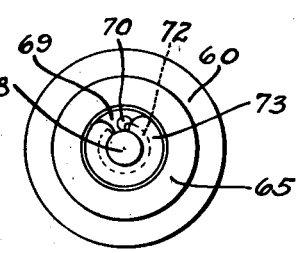
Fig. 3.        Fig. 4.        Fig. 5.
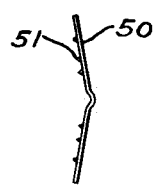
Fig. 6.
Inventor
HERMAN L. HARTZELL
By Spencer, Hardman & Fehr
his Attorney Patented Jan. 1, 1935

1,986,339

UNITED STATES PATENT OFFICE 1,986,339

ELECTRICAL CONDENSER

Herman L. Hartzell, Anderson, Ind., assignor, by mesne assignments, to General Motors Corporation, Detroit, Mich., a corporation of Delaware Application October 4, 1928, Serial No. 310,359

9 Claims. (Cl. 175—41)

This invention relates to the manufacture of condensers especially for ignition apparatus and other types of electrical apparatus wherein the use of a relatively small and compact condenser of the required capacity is desired.

One of the objects of the present invention is to provide for economical manufacture, durability of structure and efficient operation of condensers of this type.

Further objects and advantages of the present invention will be apparent from the following description, reference being had to the accompanying drawing, wherein a preferred embodiment of one form of the present invention is clearly shown.

In the drawing:

Fig. 1 is a side elevation of my condenser unit.

Fig. 2 is a vertical sectional view thereof.

Fig. 3 is a cross sectional view of my condenser unit showing the method of joining one of the foils to a terminal lead, and is taken substantially on a line 3—3 of Fig. 2.

Fig. 4 is an end view of my condenser unit taken on a line 4—4 of Fig. 2 and showing parts in cross section.

Fig. 5 is an end view of my condenser unit taken in the direction of the arrow 5 as indicated in Fig. 2.

Fig. 6 is an edge view of one of the elements of the condenser connecting means shown in Fig. 2.

Referring to the drawing, my invention is exemplified in the illustrated cartridge type condenser unit comprising a condenser assembly A, a condenser tube and support assembly B, and a condenser end assembly C.

With particular reference to the drawing, the condenser assembly is formed by winding insulated strips 20 and 21 of metal foil upon a temporary core member to a desired size or capacity, securing the ends of the insulated foils to the winding to maintain a compact unit, and later removing the temporary core, which leaves a tubular air core 22 at the axis of the foil winding. The layers of foil 20 and 21 are separated by at least two layers of insulating paper 23. After the condenser has been wound into form, paper 24 or other insulating material is wound about the form to provide an insulation and protective covering for the condenser assembly, as will later be explained.

It will be noted that one side margin of the foil strip 20 extends beyond one side margin of the paper insulation 23, and the opposite side margin of the foil 21 extends beyond the other side margin of the paper 23. The paper 24 extends beyond the margin of the paper 23 at one end sufficiently to permit the paper 24 to be rolled over the edge of the condenser assembly, thus providing an inwardly extending insulating flange 25.

As is well known to makers of this type of condensers, the side margins of the foil strips may be readily crushed together, to form in effect masses of foil metal at each end of the condenser form, in order to provide means for attaching terminals or other conductors to the condenser foil. In the present instance an insulated stranded conductor 30 is inserted through the tubular air core 22, and its bared end 33 is flattened out against the overlapping side margins of the foil strip 21 and secured thereto by soldering or sweating as at 34, which electrically connects the wire strands 31 with the foil margin. The margin of the foil 20 is similarly connected to connector strips 35 at the opposite end of the condenser assembly. The connector strips 35 are thin metallic strips preferably of copper, and are of sufficient length to be mechanically united with an enclosing case to function as a terminal means, as will later be explained.

The condenser support assembly comprises a drawn metal tubular case 40, formed so that its inside diameter will be slightly greater than the outside diameter of the condenser assembly. A non-conducting disc 41 is placed within and upon the bottom or end wall 42 of the case 40. This non-conducting disc 41 cooperates with the inturned or rolled edges 25 of the insulating material 24, when the condenser assembly is inserted within the case 40, to completely insulate the condenser assembly from the supporting case. The enclosing case 40 is provided with a supporting bracket 43 conveniently formed to embrace a portion of the case 40 and having an attaching hole 44 and means electrically and mechanically uniting the bracket to the case as by soldering indicated at 45.

The condenser end assembly is constructed by providing a metallic ring 60, with a flange 61 having an inside diameter substantially the same size as the outside diameter of the supporting case 40. The ring 60 is provided with a central aperture 62 of general circular formation, but provided at intervals 63 about the edge thereof, with notches 64 which provide anchoring means for an insulated button or sleeve 65. The insulated button 65 may be formed from any preferred non-conducting molding compound, and it is found desirable to mold the button 65 within the central aperture of the ring 60 at the time of formation.

In my button 65 I provide a hollow cylindrical extension 66 on one side thereof, which is adapted to engage the central passage 22 of the condenser assembly, or the heretofore designated air core. In the opposite face of the button 65 within a countersink or recess 67, is fixed a terminal or binding post 68, which may also be inserted at the time the button 65 is molded within the central aperture of the ring 60. About the inner surface of the binding post 68 is provided an annular arc-shaped groove 69, and angularly through the head of this binding post 68 is provided a bore 70 which extends also through the central portion 71 of the insulated button 65 to the interior or hollowed portion of the cylindrical flange 66. When assembled, the terminal member 30 is placed within the cylindrical flange 66 and passed through the bore 70 of the button and terminal screw sufficiently to present the bared ends 72 exterior of the binding post. The insulation of the terminal 30 is cut away from the connector element as it protrudes through the hole 70 close to the bottom of the annular groove 69. This presents the bared end 72 which is wound about the threaded stud of the post 68 and pressed into the groove 69 where it is securely fastened as by solder or by sweating as indicated at 73.

Prior to assembly of the various elements of the condenser unit, the winding assembly is impregnated in wax or other desired dielectric and the temporary core is then removed so that a hollow cylinder having an air core 22 is provided. The terminal unit 30 is inserted through this air core and one end thereof bent up and electrically connected with the margin of one of the foil elements as indicated at 31, the opposite end of the conductor 30 extending through the condenser core and past the opposite foil margin. The opposite or outside end of the condenser assembly has been provided with the connector strips 35, having the free ends thereof adapted to engage the side walls of the case 40 as indicated at 36. The condenser assembly is then inserted within the case 40 so that the rolled edges 25 of the insulation 24 engage the insulated disc 41 in the bottom of the case, and the connector strips 35 are bent in return fashion over diametrically opposite points of the edge of the case 40, as shown at 36.

A resilient sheet metal washer 50 of good conducting material is formed as shown in Fig. 6 with its two halves in separate planes and in diverging relation. The central aperture of this washer is of sufficient size to freely pass over the cylindrical extension 66 of the insulating button 65, and of sufficient size over all to substantially cover the outer end of the condenser assembly. The washer is provided with projections or points 51, which, when the washer 50 is placed against the outer end of the condenser assembly, the points 51 being inwardly directed, will engage the contact strips 35 and the crushed or mashed portions of the foils 20, insuring good electrical contact. The washer 50 is inserted in the outer end of the case 40 and disposed between the free ends of the connector strips 35, and when engaged by the condenser end assembly in its complete assembly position, will, by reason of the resiliency of the washer, maintain the condenser assembly within the support assembly between the bottom thereof and the condenser end assembly, in a non-movable relation.

Before the end assembly is applied, the condenser end assembly is threaded with the free end of the terminal 30 through the angular bore 70, and the end assembly is then pressed over the outer end of the case 40 with the cylindrical flange 66 engaging within the end of the air core 22, and the flange 61 pressing the free ends of the connector strips 35 over the outer edge or flange of the case 40, until the outer edge of the case 40 engages the planar portion of the ring 60. It is retained in this position as by soldering or sweating about the edge of the flange 61 and the surface of the case 40 as indicated at 74. The protruding end of the terminal 30 is then bared of its insulation and secured to the binding post 68 as hereinabove described. In this way I have provided a condenser for electrical apparatus, which is simple in design, economical in manufacture, and efficient in operation. This structure marks for compactness and durability in that the condenser assembly A is firmly but resiliently supported within the tube B, and, through the office of the disc 50, an electrical connection between one of the foils and the supporting case is always insured, while the juncture of the terminal 30 and the remaining condenser foil insures an electrical connection with the terminal post 68 and negatives any separation or breaking of connections within the unit. The attaching bracket and enclosing case, through the associated connector strips 35, provide a conductor or terminal for one of the foils, while the cooperating terminal is manifest in the post 68, with its attached lead 30 passing through the air core to the complementary foil. When the parts are in proper assembled relation, I have an efficient and compact weather-proof condenser unit, the need of which has long been felt.

While the form of embodiment of the present invention as herein disclosed, constitutes a preferred form, it is to be understood that other forms might be adopted, all coming within the scope of the claims which follow.

What is claimed is as follows:

1. An electrical condenser comprising, in combination, a tubular condenser case having a closed end, a condenser foil assembly comprising a tubular body of windings of foils and insulating strips, the side margins of the foils projecting respectively beyond the side margins of the insulating strips, means for insulating the foil margin adjacent the closed end of the case, a conductor extending through the condenser body and connected at one end with the foil margin at the closed end of the case, a conductor for grounding the other foil margin to the case, a case cover which holds the grounding conductor in position, and a terminal insulatingly supported by the cover and connected with the conductor extending through the condenser body.

2. An electrical condenser comprising, in combination, a tubular condenser case having a closed end, a condenser foil assembly comprising a tubular body of windings of foils and insulating strips, the side margins of the foils projecting respectively beyond the side margins of the insulating strips, means for insulating the foil margin adjacent the closed end of the case, a conductor extending through the condenser body and connected at one end with the foil margin at the closed end of the case, a metal disc having points projecting into the other foil margin (adjacent the open end of the case), means electrically connecting the disc and case, a case cover which holds the disc in position, and a terminal insulatingly supported by the cover and connected with the conductor extending through the condenser body.

3. An electrical condenser comprising, in combination, a tubular condenser case having a closed end, a condenser foil assembly comprising a tubular body of windings of foils and insulating strips, the side margins of the foils projecting respectively beyond the side margins of the insulating strips, means for insulating the foil margin adjacent the closed end of the case, a conductor extending through the condenser body and connected at one end with the foil margin at the closed end of the case, a conductor strip for connecting the opposite foil margin with the case, a cover for the case, a terminal on the cover connected with the conductor which extends through the body, and means located between the cover and adjacent foil margin for insuring contact between the conductor strip and foil margin.

4. An electrical condenser comprising, in combination, a tubular condenser case having a closed end, a condenser foil assembly comprising a tubular body of windings of foils and insulating strips, the side margins of the foils projecting respectively beyond the side margins of the insulating strips, means for insulating the foil margin adjacent the closed end of the case, a conductor extending through the condenser body and connected at one end with the foil margin at the closed end of the case, means grounding the other foil to the case, and a cover assembly comprising a part attachable to the case, a nonconducting body providing a sleeve extending into the condenser body, and a terminal carried by the nonconducting body and connected with said conductor which passes through the condenser body and nonconducting sleeve.

5. An electrical condenser comprising, in combination, a tubular condenser case having a closed end, a condenser foil assembly comprising a tubular body of windings of foils and insulating strips, the side margins of the foils projecting respectively beyond the side margins of the insulating strips, means for insulating the foil margin adjacent the closed end of the case, a conductor extending through the condenser body and connected at one end with the foil margin at the closed end of the case, a conductor strip connecting the opposite foil to the case, and a cover assembly comprising a flanged metal ring attached to the case, an insulating body molded thereto and a terminal embedded in the insulating body, the insulating body holding the conductor strip against the adjacent foil margin, said conductor which passes through the condenser body passing also through the insulating body and being connected to said terminal.

6. An electrical condenser comprising, in combination, a tubular condenser case having a closed end, a tubular condenser body comprising windings of foil strips and insulating strips, a cover for the case including a non-conducting body and a terminal carried thereby, flexible conductors for respectively connecting the foil strips with the case and terminal, one of said conductors being located between the condenser body and non-conducting body and thus held in position and means securing the cover to the case so as to clamp the condenser body between the closed end and one of said flexible conductors.

7. An electrical condenser comprising, in combination, a tubular condenser case closed at one end, a cover for the case including a nonconducting body and a terminal carried thereby, flexible conductors for connection with the case and terminal respectively, and an assembly comprising a cylindrical body of windings of foil strips and insulation strips, and including one of said conductors which is connected to a foil at the closed end of said case, and means including said non-conducting body for holding in position a portion of that conductor which connects a foil to the case and for clamping the cylindrical body against the closed end of the case.

8. An electrical condenser comprising, in combination, a tubular metallic case having an integral end wall, a cover subassembly for the open end of the case comprising, a flanged metal ring attachable to the case, an insulating body molded thereto and a terminal embedded in the insulating body, flexible conductors for connection with the case and terminal respectively, a condenser subassembly slidable within the condenser case and comprising a cylindrical body of windings of foil strips and of insulation strips, and including one of said conductors which is connected to a foil at the closed end of said case, means connecting said last mentioned conductor to the terminal, and means securing the said cover subassembly to the open end of the case so that said nonconducting member will urge the condenser subassembly against the end wall of the case and will clamp the other of said conductors against the other end of said condenser body.

9. An electrical condenser comprising, in combination, a tubular metallic case having an integral end wall, a cover subassembly for the open end of the case comprising, a flanged metal ring attachable to the case, an insulating body molded thereto and a terminal embedded in the insulating body, a condenser subassembly comprising a cylindrical roll of insulated foil strips and a conductor joined to the exposed margins of one of said strips, said condenser assembly being disposed for limited movement within the case so that the said conductor extends throughout the length of the case, the condenser assembly being capable of limited movement along the case, and means including said cover subassembly for connecting the other of said foils to said case, and for pressing said condenser subassembly against the closed end of the case.

HERMAN L. HARTZELL.